US012739142B2

(12) United States Patent
Maury et al.

(10) Patent No.: US 12,739,142 B2
(45) **Date of Patent: *Sep. 15, 2026**

(54) AUDIO TRANSCRIPTION FOR ELECTRONIC CONFERENCING

(71) Applicant: Apple Inc., Cupertino, CA (US)

(72) Inventors: Christopher Maury, Pittsburgh, PA (US); James A. Forrest, Pittsburgh, PA (US); Christopher M. Garrido, Santa Clara, CA (US); Patrick Miauton, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,558

(22) Filed: Dec. 8, 2023

(65) Prior Publication Data

US 2024/0113905 A1 Apr. 4, 2024

Related U.S. Application Data

(63) Continuation of application No. 17/723,459, filed on Apr. 18, 2022, now Pat. No. 11,876,632.

(60) Provisional application No. 63/197,485, filed on Jun. 6, 2021.

(51) Int. Cl.

*H04L 12/00* (2006.01)
*G06F 16/683* (2019.01)
*H04L 12/18* (2006.01)

(52) U.S. Cl.

CPC ........ *H04L 12/1831* (2013.01); *G06F 16/683* (2019.01); *H04L 12/1822* (2013.01)

(58) Field of Classification Search

CPC ............. H04L 12/1831; H04L 12/1822; G06F 16/683; H04N 7/15; H04N 7/147
USPC ........................................................ 709/204
See application file for complete search history.

(56) References Cited

U.S. PATENT DOCUMENTS

| | | | | |
|---|---|---|---|---|
| 5,563,804 | A | 10/1996 | Mortensen | |
| 5,867,654 | A * | 2/1999 | Ludwig | H04L 12/1831 348/E7.083 |
| 7,106,381 | B2 | 9/2006 | Molaro et al. | |
| 7,756,923 | B2 | 7/2010 | Caspi | |
| 8,407,049 | B2 | 3/2013 | Cromack | |
| 8,812,510 | B2 * | 8/2014 | Romanov | H04L 12/1831 707/746 |

(Continued)

OTHER PUBLICATIONS

Liu J et al. CN118379990 A, Voice data processing method, device and equipment, 2021, 16 pages (Year: 2021).*

(Continued)

*Primary Examiner* — Frantz Coby
(74) *Attorney, Agent, or Firm* — BAKERHOSTETLER

(57) ABSTRACT

Aspects of the subject technology provide for transcription of audio content during a conferencing session, such as an audio conferencing session or a video conferencing session. The transcription can be generated by the device at which the audio input is received, and transmitted to a remote device at which the transcription is displayed. Video content can also be provided from the device that generates the transcription to the remote device that displays in the transcription. The transcription can be provided with time information corresponding to time information in the video content, for synchronized display of the transcription and the corresponding video content.

21 Claims, 5 Drawing Sheets

(56) References Cited

U.S. PATENT DOCUMENTS

| | | | |
|---|---|---|---|
| 9,071,728 | B2 | 6/2015 | Begeja |
| 9,420,227 | B1 | 8/2016 | Shires et al. |
| 10,019,989 | B2 | 7/2018 | Gauci |
| 10,788,963 | B2 * | 9/2020 | Quinn ................. G06F 3/04842 |
| 10,992,907 | B1 * | 4/2021 | Bran ...................... H04N 7/147 |
| 11,165,597 | B1 | 11/2021 | Matsuguma |
| 11,594,227 | B2 | 2/2023 | Hermanns |
| 11,699,456 | B2 | 7/2023 | Donofrio |
| 11,876,632 | B2 * | 1/2024 | Maury ................ H04L 12/1831 |
| 12,020,708 | B2 * | 6/2024 | Bradley ................ G10L 15/063 |
| 2002/0069069 | A1 | 6/2002 | Kanevsky |
| 2003/0169330 | A1 | 9/2003 | Ben-Shachar |
| 2006/0190250 | A1 | 8/2006 | Saindon |
| 2007/0143103 | A1 | 6/2007 | Asthana et al. |
| 2008/0066001 | A1 * | 3/2008 | Majors ................ H04L 12/1822 348/E7.083 |
| 2008/0129864 | A1 | 6/2008 | Stone et al. |
| 2008/0204587 | A1 | 8/2008 | Takahara et al. |
| 2008/0295040 | A1 | 11/2008 | Crinon |
| 2010/0268534 | A1 | 10/2010 | Kishan Thambiratnam |
| 2010/0333175 | A1 | 12/2010 | Cox |
| 2013/0311177 | A1 | 11/2013 | Bastide |
| 2014/0108288 | A1 | 4/2014 | Calman |
| 2015/0002611 | A1 | 1/2015 | Thapliyal |
| 2017/0236532 | A1 * | 8/2017 | Reynolds .............. H04M 3/566 704/248 |
| 2017/0317843 | A1 * | 11/2017 | Brieskorn .............. H04N 7/147 |
| 2019/0147903 | A1 | 5/2019 | Totzke |
| 2020/0036546 | A1 * | 1/2020 | Soni ......................... H04N 7/15 |
| 2021/0074298 | A1 | 3/2021 | Coeytaux |
| 2022/0046066 | A1 | 2/2022 | Rothschild |
| 2022/0115019 | A1 | 4/2022 | Bradley |
| 2022/0191055 | A1 * | 6/2022 | Christensen ........... H04N 7/155 |
| 2022/0198140 | A1 | 6/2022 | Trim |
| 2022/0385758 | A1 | 12/2022 | Tadesse |

OTHER PUBLICATIONS

European Patent Application No. 22738111.8; Office Action dated Jul. 18, 2025, 6 pages.

Indian Patent Application No. 202317075805; Office Action dated Nov. 11, 2025, 5 pages with English translation.

* cited by examiner

AUDIO TRANSCRIPTION FOR ELECTRONIC CONFERENCING

CROSS REFERENCE TO RELATED APPLICATIONS

This application is a continuation of U.S. patent application Ser. No. 17/723,459, entitled "Audio Transcription for Electronic Conferencing,", filed on Apr. 18, 2022, which claims the benefit of priority to U.S. Provisional Patent Application No. 63/197,485, entitled, "Audio Transcription for Electronic Conferencing", filed on Jun. 6, 2021, the disclosure of each of which is hereby incorporated herein in its entirety.

TECHNICAL FIELD

The present description relates generally to audio transcription, and more particularly, for example, to audio transcription for electronic conferencing.

BACKGROUND

Video conferencing allows people in remote locations to each view an incoming video stream of the other in real time. In some video conferencing systems, a recording of the video conference can be used, following the video conference, to generate a transcript of the words spoken by all of the speakers in the video conference.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Conferencing applications can be installed on electronic devices to allow users of the electronic devices to exchange and view audio and/or video feeds of each other in real time, during a conferencing session between the electronic devices. In some scenarios, it can be beneficial to provide, during the conferencing session, a transcription of the spoken audio input that is being provided to one or more of the participant devices in the conferencing session.

Aspects of the subject technology disclosed herein can be helpful, for example, in providing transcriptions of audio content during a conferencing session. For example, in one or more implementations, a transcription can be generated by a device at which audio input for the conferencing session is received. The transcription generated at the device at which the audio input is received can be transmitted, during the conferencing session, to a device at which the transcription is to be displayed. For example, the audio input can include words, phrases, sentences, and/or other groups of words spoken by a user of the device at which the audio input is received.

Generating the transcription at the device at which the audio input is received (e.g., in contrast to sending an audio stream for transcription at a server or at the receiving device), can be advantageous because local voice data corresponding to the speaker of the audio input can be obtained, learned, and/or stored by the device that receives the audio input, and used to improve the audio transcription. Because this local voice data is maintained at the device of the person to which the local voice data pertains, the privacy of that person can be maintained while leveraging the local voice data for that person to improve the device's ability to generate an accurate and/or complete transcription.

Figure 1:
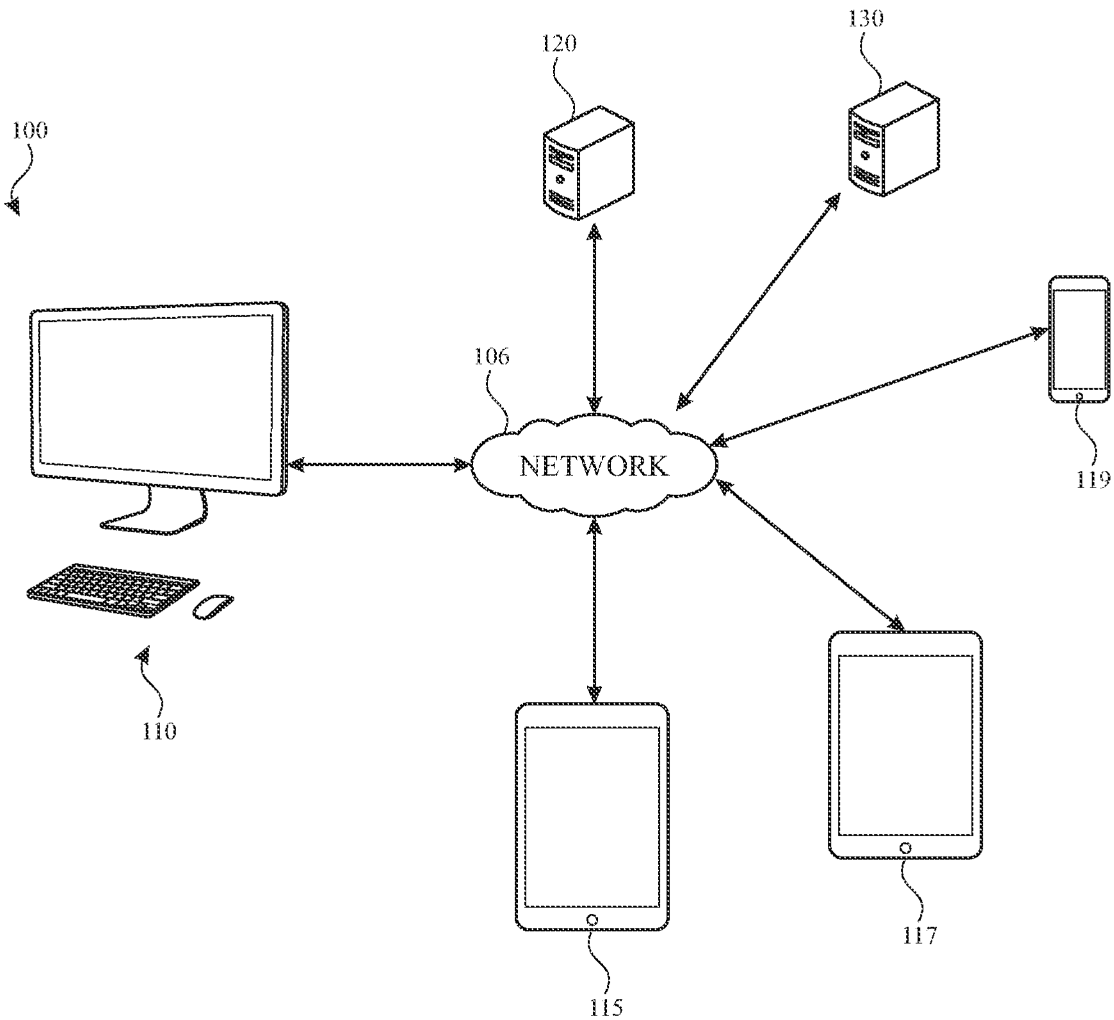
FIG. 1 illustrates an example network environment for conferencing in accordance with one or more implementations.

FIG. 1 illustrates an example network environment 100 in which conferencing with transcription may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, an electronic device 117, an electronic device 119, a server 120, and a server 130. The network 106 may communicatively couple the electronic device 110, the electronic device 115, the electronic device 117, the electronic device 119, the server 120, and/or the server 130. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 115, the electronic device 117, the electronic device 119, the server 120, and the server 130; however, the network environment 100 may include any number of electronic devices and/or any number of servers communicatively coupled to each other directly or via network 106.

Any of the electronic device 110, the electronic device 115, the electronic device 117, or the electronic device 119 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. Any of the electronic device 110, the electronic device 115, the electronic device 117, or the electronic device 119 may be, and/or may include all or part of, the electronic system discussed below with respect to FIG. 5.

In FIG. 1, by way of example, the electronic device 110 is depicted as a desktop computer, the electronic device 115 and the electronic device 117 are depicted as tablet devices, and the electronic device 119 is depicted as a smart phone. In one or more implementations, the electronic device 110, the electronic device 115, the electronic device 117, and/or the electronic device 119 may include a conferencing application and/or a transcription service installed and/or accessible at that electronic device. In one or more implementations, the electronic device 110, the electronic device 115, the electronic device 117, and/or the electronic device 119 may include a camera and/or a microphone and may provide the conferencing application for exchanging audio streams, video streams, and/or transcriptions over the network 106, such as with a corresponding conferencing application that is installed and accessible at, for example, one more others of the electronic device 110, electronic device 115, electronic device 117, and/or electronic device 119.

In one or more implementations, one or more of the electronic device 110, the electronic device 115, the electronic device 117, and/or the electronic device 119 may have a conferencing application installed and accessible at the electronic device, and may not have a transcription service available at that electronic device. In one or more implementations, one or more of the electronic device 110, the electronic device 115, the electronic device 117, and/or the electronic device 119 may not have a conferencing application installed and available at that electronic device, but may be able to access a conferencing session without the conferencing application, such as via a web-based conferencing application provided, at least in part, by one or more servers.

In one or more implementations, one or more servers such as the server 120 and/or the server 130 may perform operations for managing secure exchange of video streams between various electronic devices such as the electronic device 110, the electronic device 115, the electronic device 117, and/or the electronic device 119, such as during a conferencing session (e.g., an audio conferencing session or a video conferencing session). In one or more implementations, the server 120 may store account information associated with the electronic device 110, the electronic device 115, the electronic device 117, the electronic device 119, and/or users of those devices. In one or more implementations, one or more servers such as the server 130 may provide resources (e.g., web-based application resources), for managing connections to and/or communications within the conferencing session. In one or more implementations, one or more servers such as the server 130 may store information indicating one or more capabilities of the electronic devices that are participants in a conferencing session, such as device transcription capabilities of the participant devices and/or other device capability information.

Figure 2:
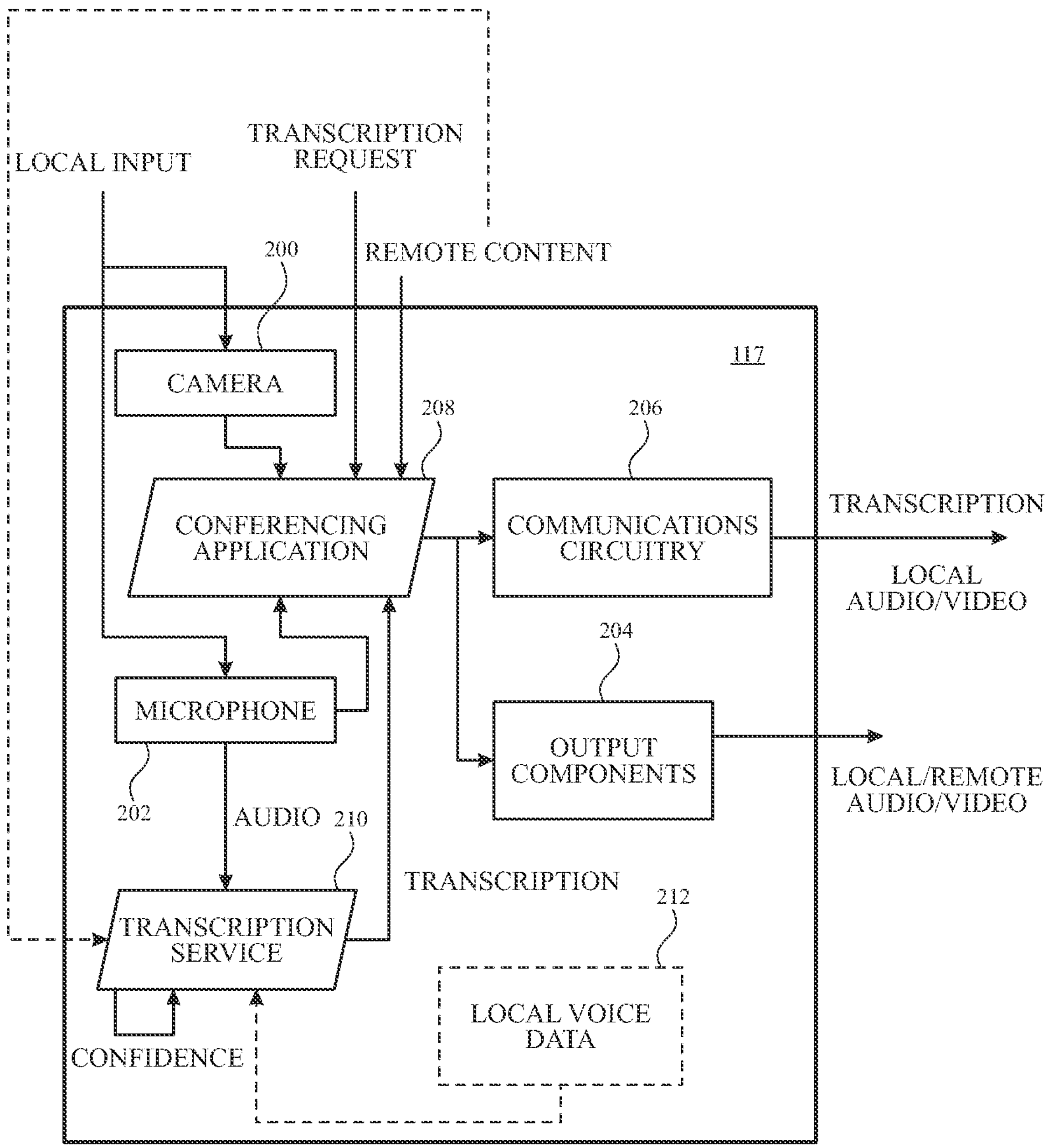
FIG. 2 illustrates a schematic view of an electronic device for providing a transcription during a conferencing session in accordance with one or more implementations.

FIG. 2 schematically illustrates various hardware and software features of an electronic device that can generate and provide transcriptions during a conferencing session, such as an audio conferencing session or a video conferencing session. In the example of FIG. 2, rectangular boxes are used to indicate hardware components, and trapezoidal boxes are used to indicate software processes that may be executed by one or more processors of the electronic device.

As shown in FIG. 2, an electronic device, such as electronic device 117, may include one or more cameras such as camera 200, one or more microphones such as microphone 202, output components 204 (e.g., a display and/or one or more speakers), and communications circuitry such as communications circuitry 206. FIG. 2 also illustrates a conferencing application 208 and a transcription service 210 that may be installed and/or running at the electronic device 117. In the example, of FIG. 2, the transcription service 210 is shown separately from the conferencing application 208 (e.g., as a system process at the electronic device 117). However, in other implementations, the transcription service 210 may be provided as a part of the conferencing application 208. As shown in FIG. 2, local input (e.g., audio input to the microphone 202 and/or video input to the camera 200) may be received by the electronic device 117. For example, the user of the electronic device 117 may speak into the microphone and/or capture video images of their self while they are speaking.

As shown, the local input may be provided from the camera 200 and/or the microphone 202 to a conferencing application 208 running on the electronic device 117. The conferencing application 208 may generate an audio stream and/or a video stream from the local input (e.g., local audio/video) and provide the audio stream and/or a video stream to the communications circuitry 206, for transmission to one or more other electronic devices, such as the electronic device 115, the electronic device 110, and/or the electronic device 119 (e.g., for output at the receiving device) during a conferencing session with the one or more other electronic devices.

FIG. 2 also shows how an audio input portion of the local input may be provided to the transcription service 210. As shown, the transcription service 210 may generate a transcription of the local audio input and provide the transcription to the conferencing application 208. In one or more other implementations, the transcription can be generated by the conferencing application 208 (e.g., the transcription service 210 may be implemented as an integral part of the conferencing application 208). The conferencing application 208 may also provide the transcription to the communications circuitry 206 for transmission to one or more other electronic devices, such as the electronic device 115, the electronic device 110, and/or the electronic device 119 during a conferencing session. In one or more other implementations, the transcription service 210 can provide the transcription directly to the communications circuitry 206 for transmission. In one or more implementations, the transcription can be generated and transmitted in segments, so that each segment of the transcription can be displayed at a received device as the corresponding audio input is being provided to the electronic device 117. The transcription service 210 or the conferencing application 208 may generate time information for the transcription. The time information can be used to synchronize the transcription with the local audio/video when the local audio/video and the transcription are rendered at a receiving device.

As illustrated in FIG. 2, the transcription service 210 may use local voice data 212 to aid in generating a transcription of an audio portion of the local input in one or more implementations. For example, the local voice data 212 may include one or more stored and/or learned attributes (e.g., frequency characteristics, commonly used words or phrases, and/or voice models at the electronic device 117 that have been trained on voice inputs from the user of the electronic device 117) of the voice of the user of the electronic device 117. In this way, the transcription service 210 at the electronic device 117 may leverage its own preexisting knowledge of the user of the electronic device 117 to generate transcriptions of spoken input by that user that are higher quality than would be otherwise possible by a general transcription service for generic voices (e.g., a transcription service provided by a server or another device of another user).

As shown in FIG. 2, the transcription service 210 may generate a confidence (e.g., a confidence score) for a transcription (e.g., for a segment of a transcription such as for a set of words spoken during a particular period of time during the conferencing session). In one or more implementations, when the confidence is below a threshold, the transcription service 210 may generate an updated transcription with an updated confidence score. If, for example, the electronic device 117 (e.g., the conferencing application 208 or the transcription service 210) determines that the updated confidence score is greater than the confidence score of the previously sent transcription, the electronic device 117 may send the updated transcription to the other device. In one or more implementations, the electronic device 117 can provide a version of the transcription (e.g., to one or more other electronic devices, such as the electronic device 115, the electronic device 110, and/or the electronic device 119 during a conferencing session) with confidence scores (and/or other 'enhancement' information for displaying and/or synchronizing the transcription) to a second device, along with a version of the transcription without the confidence scores (and/or other enhancement information), and the second device can subscribe to the version of the transcription with the enhancement information, or the version without, e.g., based on bandwidth constraints at the second device.

As shown in FIG. 2, the conferencing application 208 may also receive remote content (e.g., remote audio content and/or remote video content) from one or more other electronic devices, such as the electronic device 115, the electronic device 110, and/or the electronic device 119, during a conferencing session. As illustrated in FIG. 2, the conferencing application 208 may provide the local and/or remote audio and/or video content for output by the output components 204 during the conferencing session. In this way, the user can see their own outgoing video stream and/or one or more incoming video streams from remote devices (e.g., and hear incoming audio streams from the remote devices) during the conferencing session. FIG. 2 also illustrates how, in some operational circumstances in one or more implementations, remote content (e.g. an audio stream from one or more other electronic devices, such as the electronic device 115, the electronic device 110, and/or the electronic device 119 during a conferencing session) may also be provided to the transcription service 210. In one or more implementations, the transcription service 210 can generate a transcription of the audio portion of the remote content, and provide the transcription of the audio portion of the remote content for display by the output components 204 and/or for transmission to another device (e.g. another of the one or more other electronic devices, such as the electronic device 115, the electronic device 110, and/or the electronic device 119 during a conferencing session) that may not have the capability of generating its own transcription locally at that other device.

In an operational scenario, during a conferencing session (e.g., an audio and/or video conferencing session) between the electronic device 117 and another electronic device, such as the electronic device 115 of FIG. 1, the electronic device 117 (e.g., transcription service 210 of electronic device 117) generates a transcription of an audio input provided to the electronic device 117 (e.g., an audio portion of a local input that is obtained using a microphone, such as microphone 202), and sends the transcription to the electronic device 115.

In one or more implementations, the transcription is sent with an audio stream corresponding to the audio input. In one or more implementations, a video stream corresponding to a video input received at the electronic device 117 (e.g., a video portion of a local input obtained using one or more cameras such as camera 200) is also sent to the electronic device 115. In some examples, the transcription is sent without sending an audio stream corresponding to the audio input. In some examples, the transcription is sent without sending a video stream.

In one or more implementations, the transcription is sent with time information corresponding to time information in the video stream, for synchronizing the transcription with the video stream. In some examples, the transcription is synchronized with the video stream (e.g., as composited in the transmission to the second device and/or by the second device using the time information). For example, a time at which the transcription (or a segment thereof) was generated, or a time at which the transcribed audio input (or a segment thereof) was received can be provided along with a time at which a video input (or a segment thereof), and the time corresponding to the transcription and the time corresponding to the video input can be used to synchronize the transcription and the corresponding video stream in which a user speaks the words in the transcription.

In one or more implementations, the electronic device 117 also receives an audio stream from the electronic device 115 (e.g., an audio portion of remote content sent from the electronic device 115 to the electronic device 117 and/or one or more other participant devices in the conferencing session). The electronic device 117 (e.g., conferencing application 208 and/or output components 204 such as one or more speakers of, or connected to, the first device) may also generate an audio output corresponding to the audio stream. In one or more implementations, the electronic device 117 does not generate a transcription of the received audio stream.

In one or more implementations, the first transcription is associated with a corresponding confidence, and, after sending the first transcription, the electronic device 117 sends an update to the first transcription to the electronic device 115, the update associated with an updated confidence. In some examples, the transcription includes a confidence for each of one or more segments of the transcription. After sending a segment of the transcription with a corresponding confidence, the electronic device 117 may also send an update to the segment with an updated confidence.

In one or more implementations, the transcription is sent separately from a video stream corresponding to the transcription. In other examples, the electronic device 117 sends the transcription to the electronic device 115 integrated into a video stream from the electronic device 117 (e.g., integrated or composited into content of the image frames of the video stream).

As shown in FIG. 2, in one or more implementations the transcription can be generated based on receiving a request (e.g., a transcription request) for the transcription from the electronic device 115. In some operational scenarios, the electronic device 117 that is providing a transcription of its own audio to one or more other devices (e.g., the electronic device 115, the electronic device 110, and/or the electronic device 119) may also display a transcription of incoming audio from one or more of the other devices. In some examples, the transcription of the incoming audio can be generated at the electronic device 115 that is sending the incoming audio (e.g., using the operations described herein in connection with the transcription of the outgoing audio by transcription service 210 of FIG. 2), and sent to the electronic device 117 that is also transmitting the transcription of its own outgoing audio. The transcription of the incoming audio can be provided, for example, in response to a request for a second transcription of a second audio input from the electronic device 117 to the electronic device 115.

In other examples, the electronic device 117 may provide a request for a second transcription of a second audio input to a second device such as the electronic device 119, and determine that the electronic device 119 is unable to provide the second transcription of the second audio input that is being received at the electronic device 119. The electronic device 117 may receive an audio stream corresponding to the second audio input from the electronic device 119, and generate the second transcription of the second audio input. In some examples, the electronic device 117 (e.g., output components 204) then displays the second transcription.

In one or more implementations, the electronic device 117 determines the electronic device 119 is unable to provide the transcription based on an indication to the electronic device 117 (e.g., from the electronic device 119 and/or from a server such as server 130 that relays communications between the electronic device 117 and the electronic device 119) that the electronic device 119 is unable to provide the transcription. In some examples, the electronic device 117 also receives a video stream from the electronic device 119 and displays the video stream within a video conferencing session. In some examples, the electronic device 117 synchronizes the display of the transcription with the display of the video stream using time information received (e.g., from the electronic device 119) with the transcription.

In one or more implementations, the conferencing session includes the electronic device 117 that has an audio transcription capability, and the electronic device 119 and a third device (e.g., electronic device 110) that do not have the audio transcription capability. For example, the electronic device 119 and/or the electronic device 110 may have a version of the conferencing application 208 and/or a version of an operating system that does not include a transcription service, and/or may be a device for which a transcription service is not available. In this example scenario, the electronic device 117 may receive an audio stream from the electronic device 119, generate a second transcription corresponding to the audio stream from the electronic device 119, and provide the second transcription to the electronic device 110. In some examples, the electronic device 117 does not provide the third transcription to the electronic device 119.

In an operational scenario, the conferencing session includes a fourth device (e.g., electronic device 115) that has the audio transcription capability (e.g., the transcription service 210), and the electronic device 117 is nominated (e.g., by the server 120, the server 130, and/or one or more of the electronic device 117, the electronic device 119, and the electronic device 110) from among the electronic device 117 and the electronic device 115 to generate the second transcription, based on computing capabilities of the electronic device 117 and the electronic device 115. For example, the electronic device 117 may have a faster processor, more memory, more battery power, and/or a faster and/or more reliable network connection than the electronic device 110 in some scenarios, and may be nominated to provide the second transcription based on one or more of these attributes. In some examples, the electronic device 117 provides the second transcription to the electronic device 110 by integrating the second transcription into a video stream from the electronic device 119. In other examples, the electronic device 117 provides the second transcription to the electronic device 110 without any video information for the electronic device 119, and the electronic device 110 also receives the audio stream from the electronic device 119. In this way, transcriptions can be provided to any device in a conferencing session, as long as one of the participant devices in the conferencing session has the transcription capability. In one or more implementations, the electronic device 117 may receive a request to end the conferencing session, and end the conferencing session. In some examples, the request corresponds to user input (e.g., a hang-up input) received by the electronic device 117. In some examples, the request to end the conferencing session corresponds to user input received by the electronic device 119 (e.g., resulting in an end signal being sent from the electronic device 119 to the electronic device 117).

Figure 3:
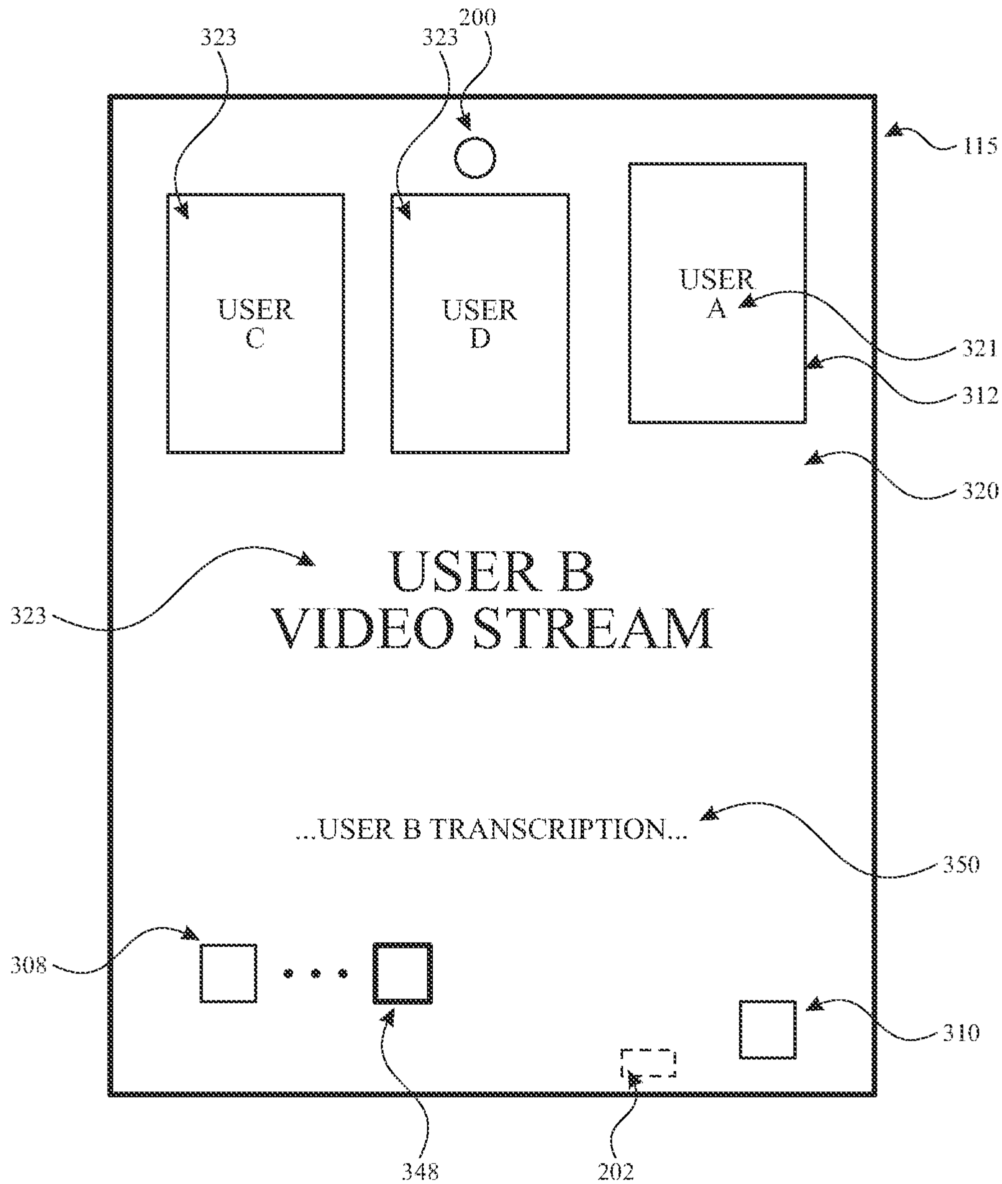
FIG. 3 illustrates a schematic diagram showing an exemplary user interface view in which a transcription is displayed along with video streams for participants during a video conferencing session in accordance with one or more implementations.

FIG. 3 illustrates an example of electronic device 115 during a conferencing session using a conferencing application, such as conferencing application 208 running at the electronic device 115. In the example of FIG. 3, the conferencing session is represented as a video conferencing session using a video conferencing application running at the device, for illustrative purposes.

As shown in FIG. 3, during a conferencing session, the conferencing application can provide, for display, a primary video stream view 320 and a secondary video stream view 312, such as a picture-in-picture video stream view. Electronic device 115 shown in FIG. 3 includes a camera 200 that obtains a continuous stream of image frames that are provided to the video conferencing application for viewing by the user of electronic device 115 (e.g., a user "A") and/or for transmission to one or more other participant devices such as electronic devices 110, 117, and/or 119 (e.g., for one or more remote users, such as user "C", user "B", and/or user "D" in this example). As described herein, audio input received at the electronic device 115 (e.g., using the microphone 202 of FIG. 2) can also be transmitted from the electronic device 115 to the electronic devices of one or more remote users (e.g., user "B", user "C", and user "D").

In the example of FIG. 3, the video stream 321 from camera 200 is an outgoing video stream being transmitted from electronic device 115 to remote electronic devices of remote users B, C, and D, and being displayed for user A in secondary video stream view 312. In the example of FIG. 3, an incoming video stream 323 from an electronic device (e.g., electronic device 117 of FIG. 2) of user "B" is displayed for viewing by user "A" in primary video stream view 320.

In the example of FIG. 3, the incoming video stream 323 for user B may be provided to the electronic device 115, for example, by a conferencing application running at electronic device 117, the incoming video stream 323 for user C may be provided to the electronic device 115, for example, by a conferencing application (e.g., an installed conferencing application or a web-based conferencing application) of electronic device 110, and the incoming video stream 323 for user D may be provided to the electronic device 115, for example, by a conferencing application of electronic device 119.

In the example of FIG. 3, primary video stream view 320 covers substantially the entire display of electronic device 115 with a portion being covered by the secondary video stream view 312, and additional video stream views for an incoming video stream 323 for each of users C and D. However, this is merely illustrative and other arrangements of primary video stream view 320 and secondary video stream view 312 can be provided (e.g., two equally sized side-by-side or top-bottom video stream views), and/or more or fewer participants (users) can participate in the video conferencing application.

In one or more implementations, one or more participant devices in the conferencing session may not provide video streams to the electronic device 115. In these implementations, an indicator (e.g., a border or other indicator of a participant device) of the participant may be provided that does not include any video content, and may visually indicate when audio content from that participant device is being output by the electronic device 115 during the conferencing session (e.g., by increasing in size, changing color, or otherwise visually changing to indicate that the corresponding user is providing audio input, such as by speaking into their own device). In the example of FIG. 3, three other participant devices are participating in the conferencing session with the electronic device 115. However, this is merely illustrative, and one, two, three, four, or more than four (e.g., five, ten, twenty, etc.) other participant devices may participate in the conferencing session at a given time.

As shown in FIG. 3, the conferencing application may also provide input options such as camera-select option 310 (e.g., for switching to a rear-facing camera or other camera to provide the video stream 321) and an add option 308, which can be selected for inviting one or more new users to the conferencing session. When a user such as user A selects the add option 308, an option may be provided to allow contact information (e.g., a telephone number or an email address) of a desired invitee to be provided to the conferencing application.

As shown in FIG. 3, during the conferencing session, a transcription 350 may be displayed by the conferencing application. In the example of FIG. 3, the transcription 350 is a transcription of audio content that is being received as input to the electronic device (e.g., the electronic device 117) of User B. The transcription may be a running transcription that includes text corresponding to segments (e.g., sentences, phrases, words, groups of words, etc.) of an audio input to the electronic device of User B (e.g., words spoken by User B into a microphone associated with the electronic device 117), the text for each segment of audio input displayed as (e.g., in synchronization with) the other user speaks that segment during the conferencing session.

As described in further detail herein (e.g., in connection with FIGS. 2 and 4), transcription 350 can be generated by the electronic device (e.g., electronic device 117) at which the audio input is initially received, and transmitted to the electronic device 115 for display (e.g., in connection with a corresponding incoming video stream 323). In one or more other implementations, the transcription 350 can be generated locally by the electronic device 115 based on an audio stream received from the electronic device 117, or can be generated by another participant device (e.g., electronic device 110) that receives the audio stream from the electronic device 117, generates the transcription, and forwards the transcription to the electronic device 115 (e.g., without providing the transcription back to the electronic device 117 at which the audio input was initially received).

As described herein, (e.g., in connection with FIGS. 2 and 4), the transcription 350 may be generated at the electronic device (e.g., electronic device 117) at which the audio input is initially received, and then received at the electronic device 115 responsive to a transcription request from the electronic device 115. For example, a user of the electronic device 115 may provide an input (e.g., via an transcription request element 348) that causes the electronic device 115 to send the transcription request to one or more other participant devices in the conferencing session. However, the transcription request element 348 of FIG. 3 is merely illustrative, and other transcription request methods and/or mechanisms can be provided. For example, settings of the conferencing application may be set (e.g., by default or by the user in a settings interface) to automatically request transcriptions for conferencing sessions joined by the electronic device 115. As another example, a user may verbally or otherwise input a transcription request to the electronic device 115, that is transmitted to one or more other participant devices.

As described in further detail herein (e.g., in connection with FIGS. 2 and 4), the electronic device 115 may also receive and display updates to the transcription 350 during the conferencing session. For example, while a segment of the transcription is still displayed in the transcription 350, the device (e.g., electronic device 117) that generated the transcription may generate an update to that segment of the transcription (e.g., a correction to the segment of the transcription based on an improved confidence for the update, such as an improved transcription using words or other context received after the audio corresponding to the segment was received) and provide the update to the electronic device 115. The electronic device 115 may then modify the currently displayed segment of the transcription in transcription 350 according to the update. For example, the update may change a word or several words in the segment to an updated word that makes more sense in the overall transcription of the segment.

In one or more implementations, the transcription 350 is received from the electronic device 117 along with an incoming video stream 323 from the electronic device 117, and displayed along with the incoming video stream 323 (e.g., in the primary video stream view 320). Time information for the transcription 350 may also be received, from the electronic device 117, that corresponds to time information in the incoming video stream 323 from the electronic device 117. The electronic device 115 (e.g., the conferencing application 208 or a rendering process at the electronic device 115) can synchronize the display of the transcription 350 with the corresponding video of the user of the electronic device 117 speaking the words being displayed in the transcription. In one or more implementations, the electronic device 115 may request transcriptions from all other devices participating in the conferencing session. In one or more implementations, when another user (e.g., user C) begins speaking, the primary video stream view 320 and the transcription 350 may switch to display the incoming video stream 323 of the User C and to display a transcription of the audio input being received at the device of User C.

In various examples, a transcription is generated by an electronic device and provided to one or more other electronic devices participating in a conferencing session based on a request from the one or more other electronic devices. In other examples, the transcription can be generated responsive to a reduction in bandwidth for the conferencing session. For example, one or more of the electronic devices and/or a server relaying information for the conferencing session may determine that the bandwidth for one or more of the electronic devices has become too low for exchanging audio and/or video data, and a transcription may be provided in lieu of the audio and/or video data (e.g., until an increase in bandwidth is detected).

Figure 4:
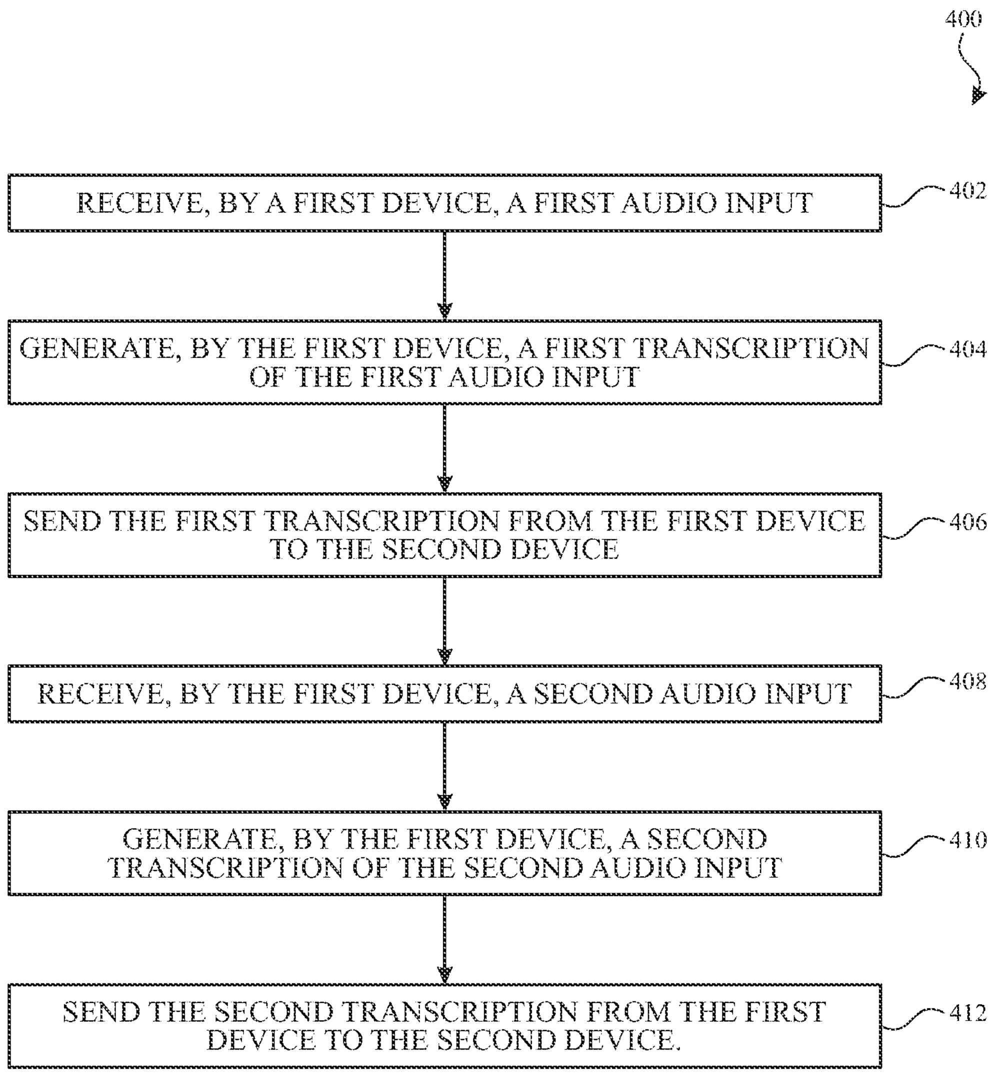
FIG. 4 illustrates a flow diagram of an example process for providing a transcription during a conferencing session in accordance with one or more implementations.

FIG. 4 illustrates a flow diagram of an example process 400 for providing a transcription during a conferencing session, in accordance with one or more implementations. For explanatory purposes, the process 400 is primarily described herein with reference to the components of FIG. 1 (particularly with reference to electronic device 117), which may be executed by one or more processors of the electronic device 117 of FIG. 1. However, the process 400 is not limited to the electronic device 117, and one or more blocks (or operations) of the process 400 may be performed by one or more other components of other suitable devices, such as one or more of the electronic device 110, the electronic device 115, the electronic device 119, and/or one or more servers such as the server 120 and/or the server 130. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

In the example process 400, during a conferencing session between at least a first device (e.g., electronic device 115) and a second device (e.g., electronic device 117), at block 402, the first device receives a first audio input. For example, the first device may receive the first audio input using a microphone (e.g., microphone 202) that is part of the first electronic device or that is locally coupled (e.g., via a local wired or wireless connection) to the first electronic device. The first audio input may correspond to a user of the first device speaking into the microphone of (or connected to) the first device. For example, the conferencing session may be an audio conferencing session, such as a call, in which audio input generated at one or more devices including the first device is exchanged with one or more other devices including the second device. In one or more implementations, the conferencing session may be a video conferencing session in which video inputs captured locally at one or more of the devices are exchanged with one or more of the other devices.

At block 404, during the conferencing session between at least the first device and the second device, the first device may generate a first transcription of the first audio input. For example the first device may generate the first transcription of the first audio input using a transcription service at the first device (e.g., as described above in connection with FIG. 2). For example, in one or more implementations, the first device may receive a transcription request from the second device. In one or more implementations, the first device may generate the first transcription based on receiving the transcription request.

At block 406, during the conferencing session between at least the first device and the second device, the first device may send the first transcription to the second device. For example, the first device may transmit the first transcription to the second device directly or over a network such as network 106 of FIG. 1. In one or more implementations, during the conferencing session, the first device may also send a first audio stream, corresponding to the first audio input, to the second device with the first transcription.

In one or more implementations, during the conferencing session, the first device may also receive (e.g., using a camera such as camera 200 of FIG. 2) a first video input (e.g., corresponding to the first audio input), and send a first video stream corresponding to the first video input from the first device to the second device. In one or more implementations, the first device may send the transcription separately from the first video stream. In one or more other implementations, the sending of the first transcription from the first device to the second device may include sending the first transcription integrated into a video stream (e.g., the first video stream) from the first device to the second device.

In one or more implementations, the first device may also, during the conferencing session, send time information corresponding to the first transcription. For example, the time information may be sent to the second device with the transcription. For example, the time information may include time information corresponding to time information in the video stream, for synchronizing the transcription with the video stream at the second device (e.g., electronic device 115).

At block 408, during the conferencing session and after sending the first transcription, the first device receives a second audio input. For example, the first device may receive the second audio input using a microphone (e.g., microphone 202) that is part of the first electronic device or that is locally coupled (e.g., via a local wired or wireless connection) to the first electronic device. The second audio input may correspond to a user of the first device continuing to speak into the microphone of (or connected to) the first device.

At block 410, during the conferencing session and after sending the first transcription, the first device generates a second transcription of the second audio input. In one or more implementations, the first device may generate the first transcription and the second transcription based on receiving the transcription request. Generating the first transcription and the second transcription at the first device (e.g., in contrast with only sending an audio stream to the second device for transcription of the audio stream at the second device) can be advantageous because local voice data (e.g., local voice data 212) that is locally learned and/or stored at the first device for the user of the first device can be used to improve the transcription (e.g., while preserving the privacy of the user of the first device by avoiding sending the local voice data off device for transcription at another device or server).

At block 412, during the conferencing session and after sending the first transcription, the first device sends the second transcription to the second device. For example, the first device may transmit the second transcription to the second device directly or over a network such as network 106 of FIG. 1.

In one or more implementations, during the conferencing session, the first device may also receive an audio stream from the second device. The first device may generate an audio output (e.g., using a speaker of or connected to the first device) corresponding to the audio stream. In one or more implementations, the first device does not generate a transcription of the received audio stream. For example, the audio stream may be received when a user of the second device speaks into a microphone at the second device, and the first device may output sound corresponding to the spoken input to the second device (e.g., so that the user of the first device can hear the user of the second device as the user of the second device speaks into their own device).

In one or more implementations, the first transcription is associated with a corresponding confidence score. For example, the confidence score for the first transcription may be generated as part of the transcription process by a transcription service at the first device (e.g., a transcription service 210 that is separate from the conferencing application 208 and/or that is provided as a part of the conferencing application 208). In one or more implementations, after sending the first transcription to the second device, the first device may send an update to the first transcription to the second device, the update associated with an updated corresponding confidence score. For example, the first device may generate the updated transcription, determine that the updated transcription has a higher confidence score than the first transcription that was previously sent to the second device, and send the updated transcription to the second device based on the determination that the updated transcription has a higher confidence score than the first transcription that was previously sent to the second device. In one or more implementations, the confidence score and the updated confidence score can also be sent to the second device (e.g., for determination, at the second device, of whether to display the updated transcription).

In one or more implementations, the first device can also generate transcriptions of audio content received from a remote device, such as the second device. For example, the first device may provide, to the second device, a request for transcription of audio input corresponding to the second device (e.g., audio input received at the second device, such as by a microphone of the second device). The first device may determine that the second device is unable to generate the transcription of the audio input corresponding to the second device. The first device may receive, from the second device, an audio stream corresponding to the audio input corresponding to the second device. The first device may also generate a transcription of the audio stream received from the second device (e.g., by providing the received audio stream to the transcription service at the first device). The first device may then display the transcription of the audio stream received from the second device (e.g., together with a corresponding video stream from the second device).

In one or more implementations, the first device may receive an audio stream from the second device and, in accordance with one or more first criteria being met, generate a third transcription corresponding to the audio stream from the second device. The first device may also provide the third transcription to a third device. For example, the one or more first criteria for generating the third transcription may include a criterion that is based on computing capabilities of the first device and a fourth device. For example, the conferencing session may include a fourth device that has the audio transcription capability, and the first device may be nominated from among the first device and the fourth device to generate the second transcription, based on computing capabilities of the first and fourth devices.

For example, the third device may request a transcription from the second device, but the second device may not have the capability of generating a transcription locally at the second device (e.g., the audio conferencing session may include the first device that has an audio transcription capability, and the second device and a third device that do not have the audio transcription capability). In this example circumstance, the first device may generate the transcription of the second device audio on behalf of the third device. For example, the third device may also receive the audio stream from the second device. In various implementations, the first device can provide the second transcription to the third device separately from audio/video information that is provided directly from the second device to the third device, or the first device can integrate the second transcription into a video stream received by the first device from the second device.

In one or more implementations, after sending the second transcription, the first device may receive a request to end the conferencing session. The first device may end the conferencing session responsive to the request to end the conferencing session.

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, location-based data, online identifiers, telephone numbers, email addresses, voice data, audio data, video data, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing a video conferencing session with a transcription. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of video conferencing with transcription, the present technology can be configured to allow users to select to “opt in” or “opt out” of participation in the collection of personal information data during registration for services or anytime thereafter. In addition to providing “opt in” and “opt out” options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user’s privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 5:
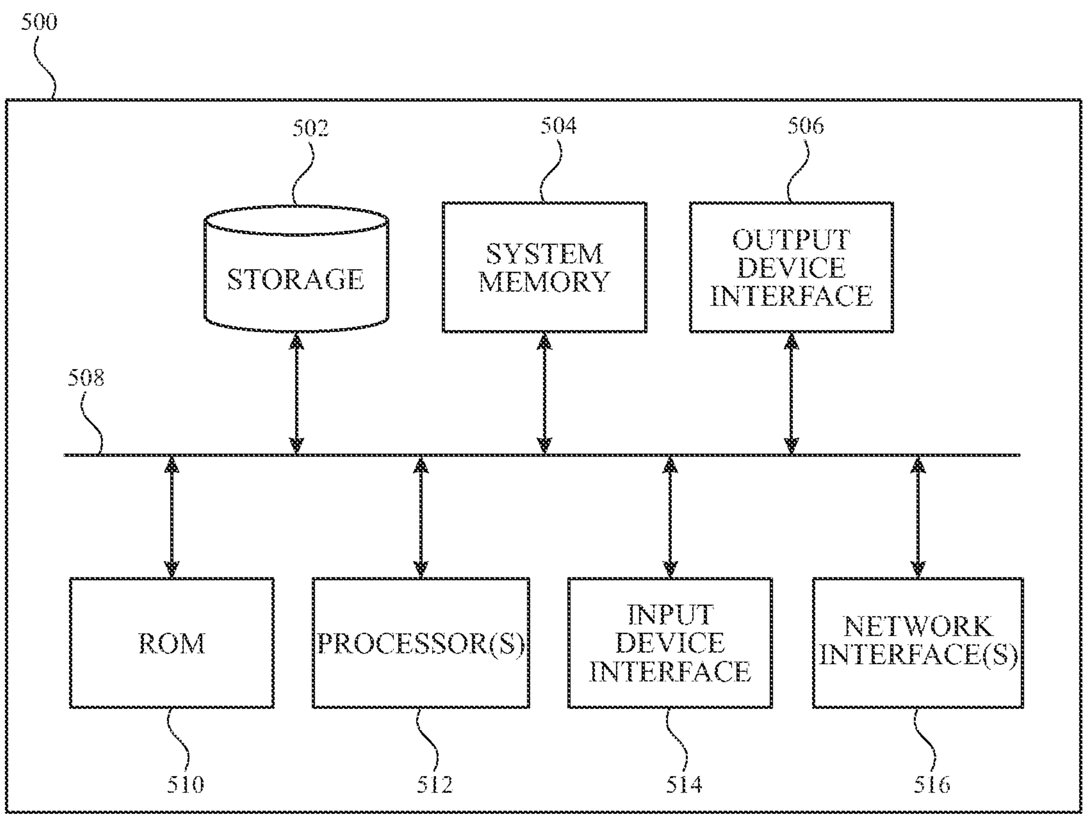
FIG. 5 illustrates an electronic system with which one or more implementations of the subject technology may be implemented.

FIG. 5 illustrates an electronic system 500 with which one or more implementations of the subject technology may be implemented. The electronic system 500 can be, and/or can be a part of, the electronic device 110, the electronic device 115, and/or the server 120 shown in FIG. 1. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called “cursor control devices”). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, such as the electronic device 115 shown in FIG. 1, through the one or more network interface(s) 516. In this manner, the electronic system 500 can be a part of a network of computers (such as a LAN, a wide area network (“WAN”), or an Intranet, or a network of networks, such as the Internet. Any or all components of the electronic system 500 can be used in conjunction with the subject disclosure.

In accordance with various aspects of the subject disclosure, a device is provided that includes a memory and one or more processors configured to, during a conferencing session between at least a first device and a second device: receive, by the electronic device, a first audio input; generate a first transcription of the first audio input; and send the first transcription from the electronic device to another device; and, during the conferencing session and after sending the first transcription: receive a second audio input; generate a second transcription of the second audio input; and send the second transcription to the other device.

In accordance with various aspects of the subject disclosure, a non-transitory computer-readable medium is provided that includes instructions, which when executed by one or more processors, cause the one or more processors to perform operations that include, during a conferencing session between at least a first device and a second device: receiving, by the first device, a first audio input; generating, by the first device, a first transcription of the first audio input; and sending the first transcription from the first device to the second device; and, during the conferencing session and after sending the first transcription: receiving, by the first device, a second audio input; generating, by the first device, a second transcription of the second audio input; and sending the second transcription from the first device to the second device.

In accordance with various aspects of the subject disclosure, a method is provided that includes, during a conferencing session between at least a first device and a second device: receiving, by the first device, a first audio input; generating, by the first device, a first transcription of the first audio input; and sending the first transcription from the first device to the second device; and, during the conferencing session and after sending the first transcription: receiving, by the first device, a second audio input; generating, by the first device, a second transcription of the second audio input; and sending the second transcription from the first device to the second device.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms “base station”, “receiver”, “computer”, “server”, “processor”, and “memory” all refer to electronic or other technological devices. These terms exclude people or groups of people. For the purposes of the specification, the terms “display” or “displaying” means displaying on an electronic device.

As used herein, the phrase “at least one of” preceding a series of items, with the term “and” or “or” to separate any of the items, modifies the list as a whole, rather than each member of the list (i.e., each item). The phrase “at least one of” does not require selection of at least one of each item listed; rather, the phrase allows a meaning that includes at least one of any one of the items, and/or at least one of any combination of the items, and/or at least one of each of the items. By way of example, the phrases “at least one of A, B, and C” or “at least one of A, B, or C” each refer to only A, only B, or only C; any combination of A, B, and C; and/or at least one of each of A, B, and C.

The predicate words “configured to”, “operable to”, and “programmed to” do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

during a conferencing session between at least a first device and a second device:

receiving, by the first device, a first audio input;

generating, by the first device using a voice model previously stored at the first device and having been trained on one or more voice inputs from a user of the first device, a first transcription of the first audio input; and sending the first transcription from the first device to the second device.

2. The method of claim 1, further comprising, during the conferencing session, sending a first audio stream corresponding to the first audio input from the first device to the second device with the first transcription.

3. The method of claim 1, further comprising, during the conferencing session:

receiving, by the first device, a first video input; and sending a first video stream corresponding to the first video input from the first device to the second device.

4. The method of claim 3, further comprising, during the conferencing session, sending time information corresponding to the first transcription from the first device to the second device.

5. The method of claim 1, further comprising, during the conferencing session:

receiving an audio stream at the first device from the second device; and generating an audio output corresponding to the audio stream, wherein the first device does not generate a transcription of the received audio stream.

6. The method of claim 1, wherein the first transcription is associated with a corresponding confidence score, the method further comprising:

after sending the first transcription from the first device to the second device, sending an update to the first transcription from the first device to the second device, the update associated with an updated corresponding confidence score.

7. The method of claim 1, wherein sending the first transcription from the first device to the second device comprises sending the first transcription integrated into a video stream from the first device to the second device.

8. The method of claim 1, further comprising:

receiving a transcription request at the first device from the second device; and generating the first transcription based on receiving the transcription request.

9. The method of claim 1, further comprising:

providing, from the first device to the second device, a request for a transcription of an audio input corresponding to the second device;

determining, by the first device, that the second device is unable to generate the transcription of the audio input corresponding to the second device;

receiving, at the first device from the second device, an audio stream corresponding to the audio input corresponding to the second device; and generating, by the first device, a transcription of the audio stream received from the second device.

10. The method of claim 1, further comprising:

receiving an audio stream at the first device from the second device; and in accordance with one or more first criteria being met:

generating, by the first device, a third transcription corresponding to the audio stream from the second device; and providing the third transcription to a third device.

11. The method of claim 10, wherein the one or more first criteria includes a criterion that is based on computing capabilities of the first device and a fourth device.

12. The method of claim 1, further comprising: after sending the first transcription, receiving, by the first device, a request to end the conferencing session; and ending the conferencing session responsive to the request to end the conferencing session.

13. A method, comprising:

providing, from a first device to a second device during a conferencing session between at least the first device and the second device, a request for a transcription of an audio input corresponding to the second device;

determining, by the first device, that the second device is unable to generate the transcription of the audio input corresponding to the second device;

receiving, at the first device from the second device, an audio stream corresponding to the audio input corresponding to the second device; and generating, by the first device, a transcription of the audio stream received from the second device.

14. The method of claim 13, wherein the audio input comprises a first audio input, and the transcription comprises a first transcription, the method further comprising, during the conferencing session:

displaying the first transcription at the first device;

receiving, by the first device, a second audio input;

generating, by the first device, a second transcription of the second audio input; and sending the second transcription from the first device to the second device.

15. The method of claim 14, further comprising, during the conferencing session, sending another audio stream corresponding to the second audio input from the first device to the second device with the second transcription.

16. The method of claim 13, wherein determining that the second device is unable to generate the transcription of the audio input corresponding to the second device comprises receiving an indication from the second device or a server that the second device does not have a transcription capability.

17. A method, comprising:

receiving an audio stream at a first device from a second device during a conferencing session between at least the first device, the second device, and a third device; and in accordance with one or more criteria being met:

generating, by the first device, a transcription corresponding to the audio stream from the second device; and providing the transcription to the third device.

18. The method of claim 17, wherein the one or more criteria includes a criterion that is based on computing capabilities of the first device and a fourth device.

19. The method of claim 18, wherein the computing capabilities of the first device and the fourth device comprise an audio transcription capability that is available at first device and the fourth device and that is unavailable at the second device.

20. The method of claim 19, wherein:

the computing capabilities of the first device and the fourth device further comprise, for each of the first device and the fourth device, one or more of: a processor speed, a memory size, a battery power, or a network connection quality; and the method further comprises generating the transcription at the first device responsive to a nomination of the first device, from among the first device and the fourth device, based on the computing capabilities of the first device and the fourth device.

21. The method of claim 1, wherein the voice model has been trained locally at the first device to generate transcriptions of audio inputs.

* * * * *